United States Patent
Benedict et al.

(10) Patent No.: US 9,604,511 B2
(45) Date of Patent: Mar. 28, 2017

(54) AIR MAINTENANCE PUMPING ASSEMBLY AND TIRE

(71) Applicant: THE GOODYEAR TIRE & RUBBER COMPANY, Akron, OH (US)

(72) Inventors: Robert Leon Benedict, Tallmadge, OH (US); Robin Lamgaday, Wadsworth, OH (US); Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/945,537

(22) Filed: Nov. 19, 2015

(65) Prior Publication Data

US 2017/0043631 A1 Feb. 16, 2017

Related U.S. Application Data

(60) Provisional application No. 62/203,534, filed on Aug. 11, 2015.

(51) Int. Cl.
*B60C 23/12* (2006.01)
*B60C 23/00* (2006.01)
*B60C 23/10* (2006.01)

(52) U.S. Cl.
CPC ............ *B60C 23/12* (2013.01); *B60C 23/004* (2013.01); *B60C 23/10* (2013.01)

(58) Field of Classification Search
CPC .................................. B60C 23/10; B60C 23/12
(Continued)

(56) References Cited

U.S. PATENT DOCUMENTS

| 1,050,886 A | 1/1913 | Wetherell |
| 1,134,361 A | 4/1915 | Wetherell |

(Continued)

FOREIGN PATENT DOCUMENTS

| DE | 3433318 | 3/1986 |
| EP | 2610088 A1 | 7/2013 |

*Primary Examiner* — Jason Bellinger
(74) *Attorney, Agent, or Firm* — Robert N. Lipcsik

(57) ABSTRACT

A tire assembly includes: a tire having a pneumatic cavity; first and second sidewalls extending respectively from first and second tire bead regions to a tire tread region, the first sidewall having at least one bending region operatively bending when circumferentially adjacent a rolling tire footprint; a sidewall groove defined by groove sidewalls positioned within the bending region of the first tire sidewall, the groove deforming segment by segment between a non-deformed state and a deformed, constricted state in response to the bending of the first sidewall bending region circumferentially adjacent the rolling tire footprint; an air passageway resiliently deforming segment by segment between an expanded condition and an at least partially collapsed condition in response to respective segment by segment deformation of the sidewall groove when circumferentially adjacent the rolling tire footprint; and an assembly mounted to the first sidewall the tire, the assembly including a pressure regulator with an elongate cylindrical housing and a rectangular mounting plate, the mounting plate having an inlet port and two outlet ports for controlling air flow from outside of the tire to and from the pneumatic cavity.

7 Claims, 1 Drawing Sheet

(58) Field of Classification Search
USPC .......................................... 152/419, 423–426
See application file for complete search history.

(56) References Cited

U.S. PATENT DOCUMENTS

| | | | |
|---|---|---|---|
| 8,235,081 B2 | 8/2012 | Delgado et al. | |
| 8,573,270 B2 * | 11/2013 | Hinque | B60C 23/12 152/419 |
| 8,746,306 B2 * | 6/2014 | Hinque | B60C 19/002 152/419 |
| 9,045,005 B2 | 6/2015 | Gobinath et al. | |
| 2014/0158267 A1 * | 6/2014 | Gobinath | B60C 19/00 152/450 |
| 2015/0158350 A1 * | 6/2015 | Hinque | B60C 23/12 152/450 |
| 2015/0165836 A1 * | 6/2015 | Lamgaday | B60C 23/12 152/450 |
| 2015/0165837 A1 * | 6/2015 | Lamgaday | B60C 23/12 152/450 |
| 2015/0165838 A1 * | 6/2015 | Benedict | B60C 23/12 152/450 |
| 2016/0052352 A1 * | 2/2016 | Chandra | B29D 30/0681 152/418 |
| 2016/0114635 A1 * | 4/2016 | Lamgaday | B60C 23/12 141/4 |

* cited by examiner

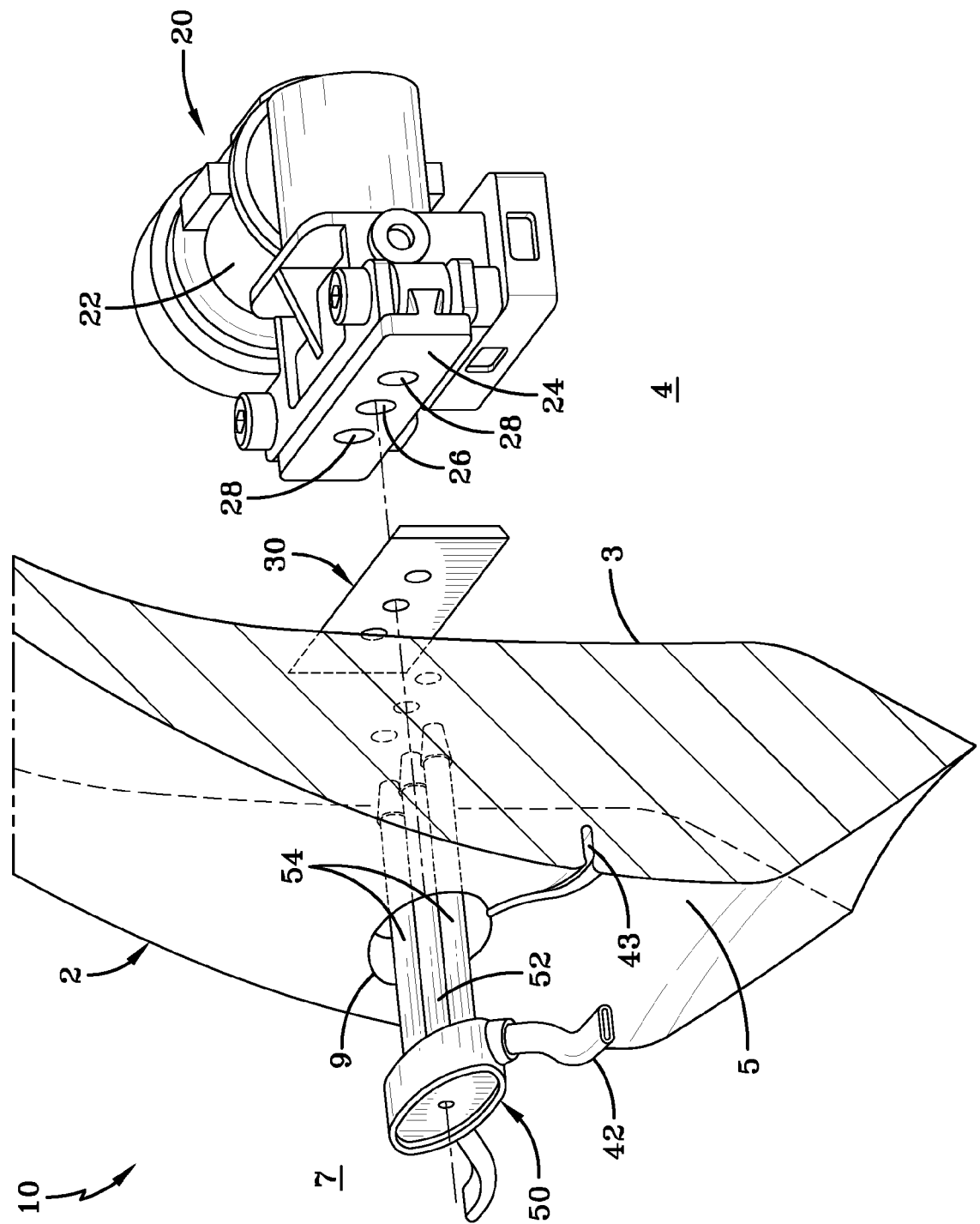

AIR MAINTENANCE PUMPING ASSEMBLY AND TIRE

FIELD OF THE INVENTION

The invention relates generally to air maintenance tires and, more specifically, to an air maintenance and tire pumping assembly.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will maintain air pressure within the tire in order to compensate for any reduction in tire pressure over time without the need for driver intervention.

SUMMARY OF THE INVENTION

A tire assembly in accordance with the present invention includes: a tire having a pneumatic cavity; first and second sidewalls extending respectively from first and second tire bead regions to a tire tread region, the first sidewall having at least one bending region operatively bending when circumferentially adjacent a rolling tire footprint; a sidewall groove defined by groove sidewalls positioned within the bending region of the first tire sidewall, the groove deforming segment by segment between a non-deformed state and a deformed, constricted state in response to the bending of the first sidewall bending region circumferentially adjacent the rolling tire footprint; an air passageway resiliently deforming segment by segment between an expanded condition and an at least partially collapsed condition in response to respective segment by segment deformation of the sidewall groove when circumferentially adjacent the rolling tire footprint; and an assembly mounted to the first sidewall the tire, the assembly including a pressure regulator with an elongate cylindrical housing and a rectangular mounting plate, the mounting plate having an inlet port and two outlet ports for controlling air flow from outside of the tire to and from the pneumatic cavity.

In accordance with another aspect of the tire assembly, an adhesive secures the pressure regulator to an inner surface of the first sidewall of the tire.

In accordance with still another aspect of the tire assembly, two ends of the air passageway are connected to either side of an oval filter placed in a corresponding oval recess in the first sidewall.

In accordance with yet another aspect of the tire assembly, an inlet tube of the oval filter directs air from the atmosphere through the first sidewall of the tire and engages the inlet port of the regulator.

In accordance with still another aspect of the tire assembly, two outlet tubes of the oval filter pass through the first sidewall the tire and engage the outlet ports of the regulator.

Another tire assembly in accordance with the present invention includes: a tire having a pneumatic cavity; first and second sidewalls extending respectively from first and second tire bead regions to a tire tread region, the first sidewall having at least one bending region operatively bending when circumferentially within a rolling tire footprint; a sidewall groove defined by groove sidewalls positioned within the bending region of the first tire sidewall, the groove deforming segment by segment between a non-deformed state and a deformed, constricted state in response to the bending of the first sidewall bending region being circumferentially within the rolling tire footprint; an air passageway defined by the sidewall groove and a tube assembly, the air passageway resiliently deforming segment by segment between an expanded condition and an at least partially collapsed condition in response to respective segment by segment deformation of the sidewall groove when circumferentially within the rolling tire footprint, the tube assembly comprising a first tube secured within the sidewall groove, the first tube resiliently deforming segment by segment between an expanded condition and an at least partially collapsed condition in response to respective segment by segment deformation of the tube assembly when circumferentially within the rolling tire footprint; and an assembly mounted to the first sidewall the tire, the assembly including a pressure regulator with an elongate cylindrical housing and a rectangular mounting plate, the mounting plate having an inlet port and two outlet ports for controlling air flow from outside of the tire to and from the pneumatic cavity.

A first example tire assembly for use with the present invention includes a tire having a pneumatic cavity, first and second sidewalls, a sidewall groove, an air passageway, and a pressure regulator mounted to an inner surface of the pneumatic tire cavity. The pressure regulator controls air pressure within the pneumatic tire cavity. The first and second sidewalls extend respectively from first and second tire bead regions to a tire tread region. The first sidewall has at least one bending region operatively bending when circumferentially within a rolling tire footprint. The sidewall groove defining groove sidewalls positioned within the bending region of the first tire sidewall. The groove deforms segment by segment between a non-deformed state and a deformed, constricted state in response to the bending of the first sidewall bending region circumferentially within the rolling tire footprint. The air passageway resiliently deforms segment by segment between an expanded condition and an at least partially collapsed condition in response to respective segment by segment deformation of the sidewall groove when circumferentially within the rolling tire footprint.

In accordance with another aspect of the first example tire assembly, the pressure regulator has an elongate cylindrical housing with a rectangular mounting projection.

In accordance with still another aspect of the first example tire assembly, the rectangular mounting projection has an inlet port and an outlet port for controlling air flow from outside of the pneumatic tire to, and from, the pneumatic tire cavity.

In accordance with yet another aspect of the first example tire assembly, the cylindrical housing has a hexagonal lug for securing the pressure regulator in a recess in the inner surface of the pneumatic tire cavity.

In accordance with still another aspect of the first example tire assembly, a rectangular protective housing secures the pressure regulator within a recess by attaching the rectangular protective housing to an inner surface of the pneumatic tire cavity.

In accordance with yet another aspect of the first example tire assembly, the cylindrical housing of the pressure regulator has a cylindrical lug for engaging a corresponding opening of the rectangular protective housing.

In accordance with still another aspect of the first example tire assembly, the rectangular protective housing defines a tapered rectangular pocket corresponding to the cylindrical lug of the pressure regulator and a rectangular recess of the inner surface of the pneumatic tire cavity.

In accordance with yet another aspect of the first example tire assembly, a recess on an inner surface of the pneumatic tire cavity accommodates the entire pressure regulator and a protective sheet covering.

In accordance with still another aspect of the first example tire assembly, the sheet covering secures the pressure regulator in the recess and defines a flush surface at the inner surface of the pneumatic tire cavity.

In accordance with yet another aspect of the first example tire assembly, the sheet covering has an opening for receiving a cylindrical lug of the pressure regulator.

A second example tire assembly for use with the present invention includes a tire having a pneumatic cavity, first and second sidewalls, a sidewall groove, a pressure regulator, an air passageway, and a tube assembly. The first and second sidewalls extend respectively from first and second tire bead regions to a tire tread region. The first sidewall has at least one bending region operatively bending when circumferentially within a rolling tire footprint. The sidewall groove defines groove sidewalls positioned within the bending region of the first tire sidewall. The groove deforms segment by segment between a non-deformed state and a deformed, constricted state in response to the bending of the first sidewall bending region being circumferentially within the rolling tire footprint. The pressure regulator is mounted to an inner surface of the pneumatic tire cavity. The pressure regulator controls air pressure within the pneumatic tire cavity. The air passageway is defined by the sidewall groove and a tube assembly. The air passageway resiliently deforms segment by segment between an expanded condition and an at least partially collapsed condition in response to respective segment by segment deformation of the sidewall groove when circumferentially within the rolling tire footprint. The tube assembly including a first tube secured within the sidewall groove. The first tube resiliently deforms segment by segment between an expanded condition and an at least partially collapsed condition in response to respective segment by segment deformation of the tube assembly when circumferentially within the rolling tire footprint.

In accordance with another aspect of the second example tire assembly, the pressure regulator has an elongate cylindrical housing with a rectangular mounting projection.

In accordance with still another aspect of the second example tire assembly, the rectangular mounting projection has an inlet port and an outlet port for controlling air flow from outside of the pneumatic tire to, and from, the pneumatic tire cavity.

In accordance with yet another aspect of the second example tire assembly, the cylindrical housing has hexagonal lugs for securing the pressure regulator in a recess in the inner surface of the pneumatic tire cavity.

In accordance with still another aspect of the second example tire assembly, a rectangular protective housing for securing the pressure regulator at least partially within a recess on an inner surface of the pneumatic tire cavity.

In accordance with yet another aspect of the second example tire assembly, the cylindrical housing of the pressure regulator has a cylindrical lug for engaging a corresponding opening of the rectangular protective housing.

In accordance with still another aspect of the second tire example assembly, the rectangular protective housing defines a tapered rectangular pocket corresponding to the cylindrical lugs of the pressure regulator and a rectangular recess of the inner surface of the pneumatic tire cavity for at least partially receiving the pressure regulator.

In accordance with yet another aspect of the second example tire assembly, a recess on an inner surface of the pneumatic tire cavity accommodates the entire pressure regulator and a protective sheet covering.

In accordance with still another aspect of the second example tire assembly, the sheet covering secures the pressure regulator in the recess and defines a flush surface at the inner surface of the pneumatic tire cavity.

In accordance with yet another aspect of the second example tire assembly, the sheet covering has an opening for receiving a cylindrical lug of the pressure regulator.

A third example tire assembly for use with the present invention may include a tire, first and second tire sidewalls, and a sidewall groove. The tire has a pneumatic cavity. The first and second sidewalls extending respectively from first and second tire bead regions to a tire tread region. The first sidewall has at least one bending region operatively bending when radially within a rolling tire footprint of the tire. The sidewall groove is defined by groove sidewalls positioned within the bending region of the first tire sidewall. The sidewall groove deforms segment by segment between a non-deformed state and a deformed, constricted state in response to the bending of the first sidewall bending region radially within the rolling tire footprint. An air passageway is defined by the sidewall groove and a cover strip. The air passageway resiliently deforms segment by segment between an expanded condition and an at least partially collapsed condition in response to respective segment by segment deformation of the sidewall groove when radially within the rolling tire footprint. The cover strip is applied at an open end of the sidewall groove for separating the air passageway from ambient air pressure.

According to another aspect of the third example tire assembly, the cover strip is cured directly to the first, already cured tire sidewall.

According to still another aspect of the third example tire assembly, the cover strip is cured to the first tire sidewall by a heated platen.

According to yet another aspect of the third example tire assembly, a separate tube is disposed within the sidewall groove. The separate tube defining a circular air passageway.

According to still another aspect of the third example tire assembly, the separate tube has an outer profile corresponding to an inner profile of the sidewall groove.

According to yet another aspect of the third example tire assembly, a second cover strip is disposed at an axially inner end of the sidewall groove.

According to still another aspect of the third example tire assembly, the first cover strip is cured directly to the first, already cured tire sidewall by a heated platen.

According to yet another aspect of the third example tire assembly, the cover strip is cord reinforced.

According to still another aspect of the third example tire assembly, the second cover strip is a gum strip.

According to yet another aspect of the third example tire assembly, the tire assembly further includes check valves disposed at multiple arcuate positions about the sidewall groove.

A fourth example tire assembly for use with the present invention may include a tire, first and second sidewalls, and a sidewall groove. The tire has a pneumatic cavity. The first and second sidewalls extend respectively from first and second tire bead regions to a tire tread region. The first sidewall has at least one bending region operatively bending when radially within a rolling tire footprint of the tire. The sidewall groove is defined by groove sidewalls positioned within the bending region of the first tire sidewall. The groove deforms segment by segment between a non-deformed state and a deformed, constricted state in response to the bending of the first sidewall bending region radially within the rolling tire footprint. An air passageway is defined by the sidewall groove and a tube assembly. The air passageway resiliently deforms segment by segment between an expanded condition and an at least partially collapsed condition in response to respective segment by segment deformation while radially within the rolling tire footprint. The tube assembly comprises a first tube and a second tube. The first tube is secured within the sidewall groove. The second tube is secured within the first tube. The second tube defines the air passageway resiliently deforming segment by segment between an expanded condition and an at least partially collapsed condition in response to respective segment by segment deformation of the tube assembly when radially within the rolling tire footprint.

According to another aspect of the fourth example tire assembly, the first tube is formed of a plastic and the second tube is formed of an extruded polymer.

According to still another aspect of the fourth example tire assembly, the second tube has an outer circular cross-section and an inner circular cross-section.

According to yet another aspect of the fourth example tire assembly, the first tube comprises relief cuts at axially inner corners of a U-shaped opening for facilitating pinching of the tube assembly.

According to still another aspect of the fourth example tire assembly, the second tube has an outer profile corresponding to an inner profile of the first tube.

According to yet another aspect of the fourth example tire assembly, the first tube comprises outer radial extensions engaging corresponding recesses in the sidewall groove for circumferentially securing the tube assembly within the sidewall groove.

According to still another aspect of the fourth example tire assembly, the outer radial extensions project radially inward.

According to yet another aspect of the fourth example tire assembly, the outer radial extensions project radially outward.

According to still another aspect of the fourth example tire assembly, the tire assembly further includes an adhesive securing the first tube within the sidewall groove.

According to yet another aspect of the fourth example tire assembly, the first tube comprises an inner partially closed U-shaped profile in cross-section and an outer partially closed U-shaped profile in cross-section.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire dimensioned and configured in section for receipt of an air tube therein.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by a shape with adjacent grooves.

"Tread Arc Width" means the arc length of the tread as measured between the lateral edges of the tread.

BRIEF DESCRIPTION OF THE DRAWINGS

The present invention will be described by way of example and with reference to the accompanying drawings, in which:

FIG. 1 is a schematic isometric view of an assembly in accordance with the present invention.

DETAILED DESCRIPTION OF EXAMPLES OF THE PRESENT INVENTION

An example tire assembly for use with the present invention in described in U.S. Pat. No. 9,045,005, herein incorporated by reference in its entirety. The assembly may include a pneumatic tire, a peristaltic pump assembly, and a tire rim. The pneumatic tire may mount in conventional fashion to a pair of rim mounting surfaces adjacent outer rim flanges. The pneumatic tire may be of conventional construction, having a pair of sidewalls extending from opposite bead areas to a crown or tread region. The pneumatic tire and rim may enclose a tire cavity.

The example peristaltic pump assembly may include an annular 180 degree air tube that encloses an annular passageway. The example tube may be formed of a resilient, flexible material such as plastic or rubber compounds that are capable of withstanding repeated deformation cycles of a flattened condition subject to external force and, upon removal of such force, returned to an original condition generally circular in cross-section. The example tube may have a diameter sufficient to operatively pass a volume of air for purposes described herein and allowing a positioning of the tube in an operable location within the example tire assembly as will be described below. The tube may be an elongate, generally T-shaped in cross-section, having opposite tube connector assemblies extending in operation from a flat (closed) trailing tube end to a radiussed (open) leading tube end. The tube may have a longitudinal outwardly projecting pair of locking detent ribs of generally semi-circular cross-section with each rib extending along outward surfaces of the tube.

The example tube may be profiled and geometrically configured for insertion into a groove in a sidewall of the pneumatic tire. The groove may have an elongate, generally T-shaped configuration. The example peristaltic pump assembly may further include an inlet device and an outlet device/filter device spaced diametrically apart approximately 180 degrees at respective ends of the circumferential 180 degree air tube.

The example inlet device may have an L-shaped configuration in which conduits direct air to, and from, the tire cavity. The inlet device may have an inlet device housing from which the respective conduits extend. Each of the conduits may have external coupling ribs for retaining the conduits within the open ends of the air tube in an assembled condition. The housing may be formed with an external geometry complementing the groove. The housing may thus be capable of close receipt corresponding to the groove at its intended location.

The example filter device may have an elongate configuration in which an air intake and a conduit direct air to, and from, the tire cavity. The filter device may have a filter device housing from which the conduit extends. The conduit may have external coupling ribs for retaining the conduit within the open end of the air tube in an assembled condition. The housing may be formed with an external geometry complementing an air intake opening in an outer surface of the bead area of the pneumatic tire. The housing may thus be capable of close receipt corresponding to the air intake opening at its intended location.

An example pressure regulator may have an elongate cylindrical housing with a rectangular mounting projection. The mounting projection may have an inlet port and an outlet port for controlling air flow from outside of the pneumatic tire to and from the tire cavity. The cylindrical housing may have hexagonal lugs for securing the pressure regulator in a recess on an inner surface of the bead area. A rectangular protective housing may secure the pressure regulator within the recess by attaching the housing to the inner surface of the bead area. The cylindrical housing of the pressure regulator may have a cylindrical lug for engaging a corresponding hole of the rectangular housing.

The pressure regulator and protective housing may be assembled in a post-cure process of the pneumatic tire. The housing may create a tapered rectangular pocket corresponding to the lugs of the pressure regulator and the rectangular recess of the bead area for securing the pressure regulator to the bead area. This assembly thus may protect the pressure regulator, the conduits, and the retreading bladder during a retreading operation.

The example pressure regulator may alternatively be assembled with a pneumatic tire have a deeper recess for accommodating the entire pressure regulator and a protective sheet covering instead of the protective housing. The sheet covering may secure the pressure regulator in the recess and provide a flush surface at the inner surface of the bead area. The sheet covering may similarly have a corresponding hole for receiving the cylindrical lug of the pressure regulator.

The example outlet device may have an L-shaped configuration in which conduits direct air to, and from, the tire cavity. The outlet device may have an outlet device housing from which the respective conduits extend. Each of the conduits may have external coupling ribs for retaining the conduits within the open ends of the air tube in an assembled condition. The housing may be formed with an external geometry complementing the groove. The housing may thus be capable of close receipt corresponding to the groove at its intended location.

Another example peristaltic pump assembly may include an annular 340-360 degree air tube that encloses an annular passageway. The example tube may be formed of a resilient, flexible material such as plastic or rubber compounds that are capable of withstanding repeated deformation cycles of a flattened condition subject to external force and, upon removal of such force, returned to an original condition generally circular in cross-section. The example tube may have a diameter sufficient to operatively pass a volume of air for purposes described herein and allowing a positioning of the tube in an operable location within the example tire assembly as will be described below. In the example configuration shown, the tube may be an elongate, generally T-shaped in cross-section, having opposite tube connector assemblies extending in operation from a flat (closed) section to a radiussed (open) leading section. The tube may have a longitudinal outwardly projecting pair of locking detent ribs of generally semi-circular cross-section with each rib extending along outward surfaces of the tube.

The example tube may be profiled and geometrically configured for insertion into the T-shaped groove. The example peristaltic pump assembly may further include the inlet device and the outlet device/filter device spaced apart spaced apart the length of a similarly T-shaped spacer within the groove.

As described above, the pressure regulator and protective housing may be assembled in a post-cure process of the pneumatic tire. This assembly thus may protect the pressure regulator, the conduits, and the retreading bladder during a retreading operation. This peristaltic pump assembly may also be utilized with the alternative deeper recess and sheet covering described above.

A bi-directional example peristaltic pump assembly may include two annular 160-180 degree air tubes that enclose the annular passageway. The example tubes may be formed of a resilient, flexible material such as plastic or rubber compounds that are capable of withstanding repeated deformation cycles of a flattened condition subject to external force and, upon removal of such force, returned to an original condition generally circular in cross-section. The example tubes may have a diameter sufficient to operatively pass a volume of air for purposes described herein and allowing a positioning of the tubes in an operable location within the example tire assembly as will be described below.

The tubes may be an elongate, generally T-shaped in cross-section, having opposite tube connector assemblies extending in operation from a flat (closed) trailing tube end to a radiussed (open) leading tube end. The tubes may have a longitudinal outwardly projecting pair of locking detent ribs of generally semi-circular cross-section with each rib extending along outward surfaces of the tubes.

The example tubes may be profiled and geometrically configured for insertion into the groove. The groove may have an elongate, generally T-shaped configuration. The example peristaltic pump assembly may further include an inlet device and an outlet device/filter device spaced apart approximately 180 degrees at respective ends of the circumferential 160-180 degree air tubes.

The example inlet device may have a T-shaped configuration in which conduits (2) direct air to, and from, the tire cavity. The inlet device may have an inlet device housing from which the respective conduits extend. The conduits may have external coupling ribs for retaining the conduits within the open ends of the air tubes in an assembled condition. The housing may be formed with an external geometry complementing the groove. The housing may thus be capable of close receipt corresponding to the groove at its intended location.

The example outlet device may have a double L-shaped configuration in which conduits (4) direct air to, and from, the tire cavity. Each conduit may have a check valve only allowing air into the tire cavity. The outlet device may have an outlet device housing from which the respective conduits extend. The conduits may have external coupling ribs for retaining the conduits within the open ends of the air tubes in an assembled condition. The housing may be formed with an external geometry complementing the groove. The housing may thus be capable of close receipt corresponding to the groove at its intended location.

The pressure regulator and protective housing may be assembled in a post-cure process of the pneumatic tire. The housing may create a tapered rectangular pocket corresponding to the lugs of the pressure regulator and the rectangular recess of the bead area for securing the pressure regulator to the bead area. This assembly thus may protect the pressure regulator, the conduits and the retreading bladder during a retreading operation.

One example method of operation of the assembly may be as described in U.S. Pat. No. 8,235,081, which is herein incorporated by reference in its entirety. From the forgoing, it will be appreciated that the present invention comprises a bi-directionally peristaltic pump assembly for air maintenance of a pneumatic tire. The peristaltic pump assembly may pump air through rotation of the pneumatic tire in either direction, one half of a revolution pumping air to the tire cavity and the other half of a revolution pumping air back out of the inlet device. The peristaltic pump assembly may be used with a secondary tire pressure monitoring system (TPMS) that may serve as a fault detector for the assembly. The TPMS may be used to detect any fault in the self-inflation system of the tire assembly and alert a user of such a condition.

The above described example assembly uses the bending motion of the tire sidewall to pinch a pump the tube closed. This requires that the pump tube be located in an area of high tire sidewall flex. Passages through the tire sidewall are required to conduct the air into the tire cavity. It may be desirable to locate these passages in areas of low flex to promote long, trouble fee life for the assembly. It may also be desirable to keep the filter holder away from the rim to prevent it from striking the rim in service. A design in accordance with the present invention may create a passage exterior to the plies that conducts the air from the high flex area of the pump tubes to a lower flex area where the filter holder and passages are located. By placing the passages in a circumferential line, the stress at the regulator may be decreased which, in turn, decreases strains due to tire flex at the regulator/tire attachment. Previous designs had passages in the same location as the pump tubes. The design of the present invention may decouple passage location from the pump tube location.

As shown in FIG. 1, an example assembly 10 in accordance with the present invention may include a pressure regulator 20 with an elongate cylindrical housing 22 and a rectangular mounting plate 24. The mounting plate 24 may have an inlet port 26 and two outlet ports 28 for controlling air flow from outside of the pneumatic tire 2 to and from the tire cavity 4. An adhesive 30 may secure the regulator 20 to the inner sidewall 3 of the pneumatic tire 2. The pump tube 42 described above may be inserted in a groove 43 in the outer sidewall 5 of the pneumatic tire 2. Two ends of the pump tube 42 may be connected to either side of an oval filter 50 placed in a corresponding oval recess 9 in the outer sidewall 5. One inlet tube 52 of the filter 50 may direct air from the atmosphere 7 through the sidewall of the pneumatic tire 2 and engage the inlet port 26 of the regulator 20. Two outlet tubes 54 of the filter 50 may pass through the sidewall of the pneumatic tire 2 and engage the outlet ports 28 of the regulator 20. The assembly 10 may be assembled in a post-cure process of the pneumatic tire 2.

Variations in the present invention are possible in light of the description of it provided herein. While certain representative examples and details have been shown for the purpose of illustrating the present invention, it will be apparent to those skilled in this art that various changes and modifications may be made therein without departing from the scope of the present invention. It is, therefore, to be understood that changes may be made in the particular examples described which will be within the full intended scope of the present invention as defined by the following appended claims.

What is claimed:

1. A tire assembly comprising:
   a tire having a pneumatic cavity;
   first and second sidewalls extending respectively from first and second tire bead regions to a tire tread region, the first sidewall having at least one bending region operatively bending when circumferentially adjacent a rolling tire footprint;
   a sidewall groove defined by groove sidewalls positioned within the bending region of the first tire sidewall, the groove deforming segment by segment between a non-deformed state and a deformed, constricted state in response to the bending of the first sidewall bending region circumferentially adjacent the rolling tire footprint, an air passageway, defined by a tube secured within the sidewall groove, resiliently deforming segment by segment between an expanded condition and an at least partially collapsed condition in response to respective segment by segment deformation of the sidewall groove when circumferentially adjacent the rolling tire footprint; and
   an assembly mounted to the first sidewall the tire, the assembly including a pressure regulator with an elongate cylindrical housing and a rectangular mounting plate, the mounting plate having an inlet port and two outlet ports for controlling air flow from outside of the tire to and from the pneumatic cavity.

2. The tire assembly as set forth in claim 1 wherein an adhesive secures the pressure regulator to an inner surface of the first sidewall of the tire.

3. A tire assembly comprising:
a tire having a pneumatic cavity;
first and second sidewalls extending respectively from first and second tire bead regions to a tire tread region, the first sidewall having at least one bending region operatively bending when circumferentially within a rolling tire footprint;
a sidewall groove defined by groove sidewalls positioned within the bending region of the first tire sidewall, the groove deforming segment by segment between a non-deformed state and a deformed, constricted state in response to the bending of the first sidewall bending region being circumferentially within the rolling tire footprint, and a tube assembly, the air passageway resiliently deforming segment by segment between an expanded condition and an at least partially collapsed condition in response to respective segment by segment deformation of the sidewall groove when circumferentially within the rolling tire footprint, the tube assembly comprising a first tube secured within the sidewall groove, the first tube resiliently deforming segment by segment between an expanded condition and an at least partially collapsed condition in response to respective segment by segment deformation of the tube assembly when circumferentially within the rolling tire footprint; and
an assembly mounted to the first sidewall the tire, the assembly including a pressure regulator with an elongate cylindrical housing and a rectangular mounting plate, the mounting plate having an inlet port and two outlet ports for controlling air flow from outside of the tire to and from the pneumatic cavity.

4. The tire assembly as set forth in claim 3 wherein an adhesive secures the mounting plate to an inner surface of the first sidewall of the tire.

5. The tire assembly as set forth in claim 3 wherein two ends of the air passageway are connected to either side of an oval filter placed in a corresponding oval recess in the first sidewall.

6. The tire assembly as set forth in claim 5 wherein an inlet tube of the oval filter directs air from the atmosphere through the first sidewall of the tire and engages the inlet port of the regulator.

7. The tire assembly as set forth in claim 6 wherein two outlet tubes of the oval filter pass through the first sidewall the tire and engage the outlet ports of the regulator.

\* \* \* \* \*